United States Patent
Sternberg et al.

(10) Patent No.: US 7,593,460 B2
(45) Date of Patent: Sep. 22, 2009

(54) MACRO DIVERSITY EQUALIZATION SYSTEM AND METHOD

(75) Inventors: Gregory S. Sternberg, Mt. Laurel, NJ (US); Rui Yang, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 619 days.

(21) Appl. No.: 11/263,507

(22) Filed: Oct. 31, 2005

(65) Prior Publication Data
US 2007/0025434 A1    Feb. 1, 2007

Related U.S. Application Data

(60) Provisional application No. 60/702,862, filed on Jul. 27, 2005.

(51) Int. Cl.
*H03H 7/30* (2006.01)
(52) U.S. Cl. ..................................................... 375/229
(58) Field of Classification Search ......... 375/229–236, 375/267, 299, 347, 349; 333/18, 28 R; 708/300, 708/322, 323; 379/340, 398; 700/53; 455/101, 455/132–141
See application file for complete search history.

(56) References Cited

U.S. PATENT DOCUMENTS

| | | | | |
|---|---|---|---|---|
| 7,010,030 B2* | 3/2006 | Vaidyanathan | ............. | 375/233 |
| 2007/0165707 A1* | 7/2007 | Margetts et al. | ............. | 375/150 |

* cited by examiner

*Primary Examiner*—Sam K Ahn
(74) *Attorney, Agent, or Firm*—Volpe and Koenig, P.C.

(57) ABSTRACT

An equalization system and method which supports macro diversity as well as large delay spread channels with a minimal increase in complexity is disclosed. The equalization system includes a path searcher, an optional search scheduler, a multi-equalizer manager, an alignment buffer, a plurality of equalizers and an equalizer combiner. The path searcher detects positions of paths of the received signals. The equalizers are used to perform equalization on the received signals. The multi-equalizer manager controls the equalizers by assigning specific positions of the paths to respective ones of the equalizers. The equalizer combiner then combines outputs from the equalizers.

22 Claims, 3 Drawing Sheets

MACRO DIVERSITY EQUALIZATION SYSTEM AND METHOD

CROSS REFERENCE TO RELATED APPLICATION

This application claims the benefit of U.S. Provisional Patent Application No. 60/702,862 filed Jul. 27, 2005, which is incorporated by reference as if fully set forth.

FIELD OF INVENTION

The present invention is related to equalizing signals received by a receiver. More particularly, the present invention is related to a macro diversity equalization system which assigns specific path positions of the received signals to respective ones of a plurality of equalizers to support large delay spread channels and macro diversity combining.

BACKGROUND

Equalizers are commonly used in wireless communications systems. In order to perform equalization in environments with a large delay spread, the equalizer span must grow quite large, which results in a significant increase in complexity. Additionally, a problem of performing macro diversity combining with an equalizer-based architecture exists in conventional wireless communication systems.

One solution for equalizing signals that have passed through large delay spread channels or those received from multiple Node-Bs, (e.g., for macro diversity), is a Rake-based solution. However, Rake-based solutions do not, in general, provide sufficient cross path interference cancellation for low spreading factor data channels, such as those used in a high speed downlink packet access (HSDPA) service. Without sufficient cross path interference cancellation, the performance of a receiver may not be acceptable for HSDPA.

Conventional wireless communication systems require a hybrid Rake/equalizer solution which cannot share hardware and/or software resources. This is due to the fact that, as completely different algorithms, they have few data processing operations in common. In accordance with the release 4 (R4) universal mobile telecommunication services (UMTS) frequency division duplex (FDD) standards, any receiver must be tolerant of large delay spread channels, (e.g., >20 µs), and be capable of performing combining of signals from multiple Node-Bs.

SUMMARY

The present invention is related to an equalization system which supports macro diversity as well as large delay spread channels with a minimal increase in complexity. The equalization system includes a path searcher, an optional search scheduler, a multi-equalizer manager, an alignment buffer, a plurality of equalizers and an equalizer combiner. The path searcher detects positions of paths of the received signals. The equalizers are used to perform equalization on the received signals. The multi-equalizer manager controls the equalizers by assigning specific positions of the paths to respective ones of the equalizers. The equalizer combiner then combines outputs from the equalizers.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "wireless transmit/receive unit" (WTRU) includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention is applicable to any wireless communication systems including, but not limited to, R4 and R5 of UMTS standards.

The features of the present invention may be incorporated into an integrated circuit (IC) or be configured in a circuit comprising a multitude of interconnecting components.

The present invention provides an equalization system for supporting macro diversity combining as well as large delay spread channels. Additionally, the present invention solves the problem of combining signals received from different cells, (macro diversity combining), as well as from largely different delays in an optimal way. The present invention allows for a low complexity solution to achieving an equalizer-based architecture for equalizing signals that have passed through a large delay spread channel and/or originating from different transmitters, (i.e., macro diversity).

Figure 1:
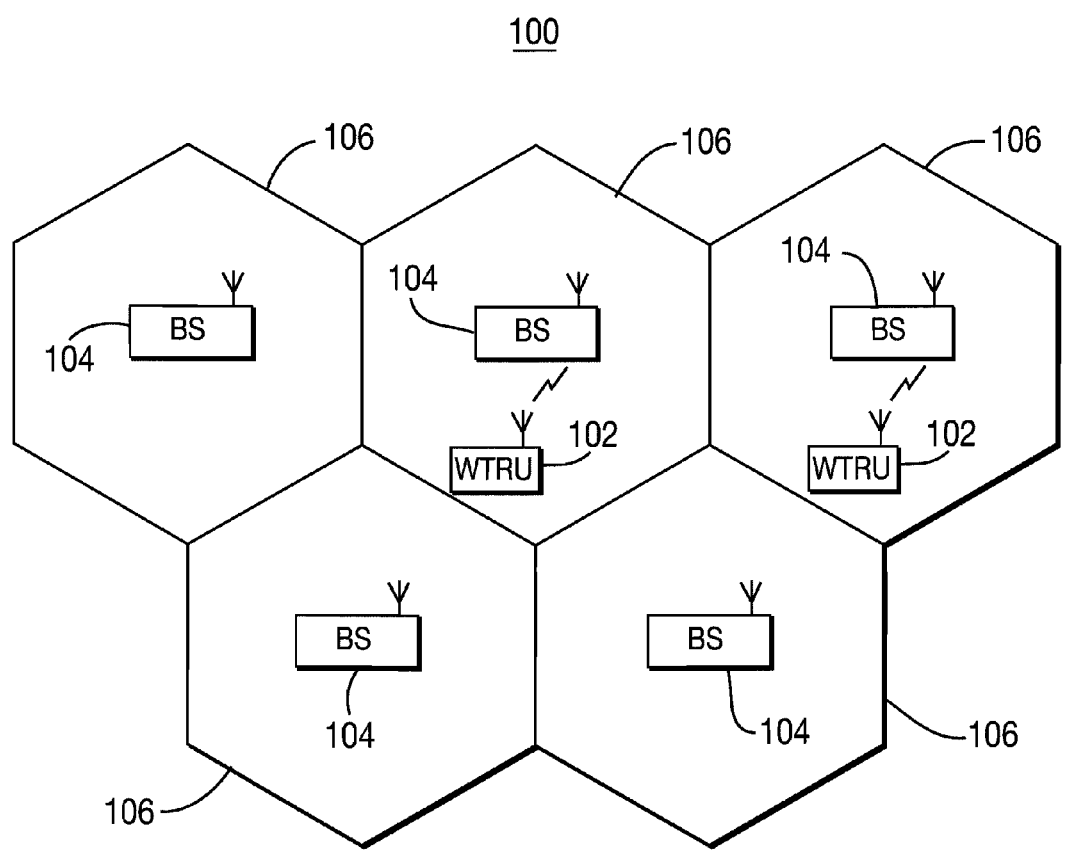
FIG. 1 shows a wireless communication system in which the present invention is implemented.

FIG. 1 shows a wireless communication system 100 in which the present invention may be implemented. The wireless communication system 100 includes a plurality of cells 106, each of which is served by a base station (BS) 104. WTRUs 102 are spread out over the coverage area of the system 100. The WTRUs 102 and the base stations 104 communicate through channels established between them. The transmissions from the WTRUs 102 and the base stations 104 include a known code sequence, (e.g., a pilot sequence), in addition to traffic signals.

The transmitted signals from a base station 104 or a WTRU 102 arrive at the WTRU 102 or the base station 104 through multiple paths, whereby the multipath components of the same signals overlap each other, but are shifted in time, thus causing inter-symbol interference. The WTRU 102 may receive signals from more than one base station 104, such as during a handover. Typically, the WTRU 102 may use these signals for performing macro diversity combining whereby the same signal is transmitted to the WTRU 102 from two or more base stations 104 to be combined at the WTRU 102, or vice versa. The transmitted signals arrive at the WTRU 102 at different times, thereby providing an additional source of inter-symbol interference.

A conventional WTRU 102 and/or base station 104 would include an equalizer to remove the inter-symbol interference. However, in accordance with the present invention, more than one equalizer is utilized to process signals through multiple paths.

All equalizers correct distortion by performing interference cancellation of inter-path interference, and generate an estimate of the transmitted symbols. Equalizers typically include a filter comprising a plurality of taps. For example, an equalizer may be implemented by a finite impulse response (FIR) filter. If a single equalizer is utilized with a large number of taps to cover both a large delay spread and the delay differences associated with macro diversity, (i.e., multi-cell reception), the complexity of the equalizer would be impractical. Moreover, the performance of the equalizer would not be acceptable as there would be many filter taps that would introduce nothing but noise. The present invention provides a novel structure to achieve equalization without the impractical complexity of a single large filter equalizer by utilizing two or more equalizers, and combining the outputs from the equalizers.

Figure 2:
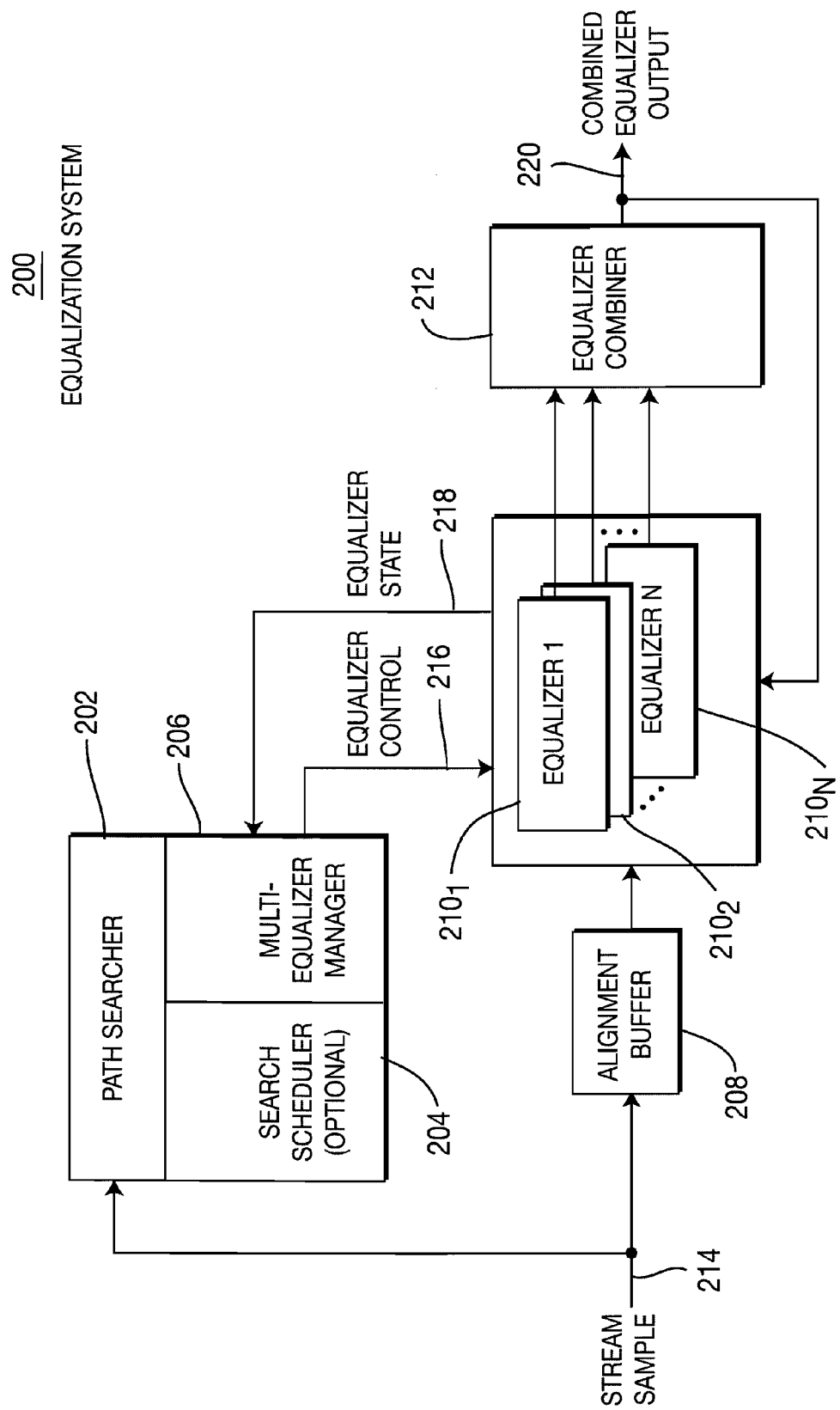
FIG. 2 is a block diagram of an equalization system configured in accordance with the present invention.

FIG. 2 is a block diagram of an equalization system 200 configured in accordance with the present invention. The equalization system 200 includes a path searcher 202, an optional search scheduler 204, a multi-equalizer manager 206, an alignment buffer 208, a plurality of equalizers $210_1$-$210_N$ and an equalizer combiner 212. A sample stream 214 generated from received signals enters the path searcher 202 and the alignment buffer 208. The path searcher 202 detects positions of one or more paths of the received signals by preferably utilizing a pilot sequence. The sample stream 214 to be processed by the equalizers $210_1$-$210_N$ is aligned for each equalizer $210_1$-$210_N$ by the alignment buffer 208.

The optional search scheduler 204 specifies when and how often the path searcher 202 should re-visit a certain cell to detect a path from the cell. The search scheduler 204 is not needed if each cell has a standalone path search hardware component. If implemented, the search scheduler 204 specifies when the path searcher 202 should measure the channel impulse response for any given cell and for any given range of delay. For example, the search scheduler 204 specifies the search schedule by considering the number of hardware elements and the frequency of observations needed for proper equalization. Since multi-path components appear and disappear quite often in the wireless communication channels, these events need to be observed by the path searcher 202 and reacted to by the multi-equalizer manager 206.

The detected paths are assigned to the equalizers $210_1$-$210_N$ by the multi-equalizer manager 206. The equalizers $210_1$-$210_N$ may be placed at different time positions. The multi-equalizer manager 206 sends an equalizer control signal 216 to the equalizers $210_1$-$210_N$. The equalizer control signal 216 includes commands such as "assign equalizer block" or "de-allocate equalizer block". The "assign equalizer block" command indicates a specific time position, corresponding to a sample location in the alignment buffer, to the equalizer $210_1$-$210_N$ and the "de-allocate equalizer block" command frees the addressed equalizer $210_1$-$210_N$.

The multi-equalizer manager 206 determines which equalizers $210_1$-$210_N$ to assign to the different time lags, (or positions). In one embodiment of the present invention, the multi-equalizer manager 206 monitors the channel impulse responses and prioritizes the channel impulse responses from the strongest to the weakest. The multi-equalizer manager 206 assigns specific positions of the paths to respective ones of the equalizers $210_1$-$210_N$, starting with the position associated with the strongest channel impulse response to the position associated with the weakest channel impulse response. The assigning process is terminated when there are no more equalizers remaining to be assigned a position. Alternatively, the path searcher 202 may report multiple clusters of paths, and the multi-equalizer manager 206 may allocate one or more equalizers to each cluster. It should be noted that the above schemes are provided as examples and any other variations may be implemented.

An equalizer state signal 218 is sent from each equalizer $210_1$-$210_N$ to the multi-equalizer manager 206. The equalizer state signal 218 is used by the multi-equalizer manager 206 to determine when to de-allocate a particular equalizer $210_1$-$210_N$. For example, the equalizer state signal 218 may be the values of the filter coefficients as the equalizers $210_1$-$210_N$ adapt. This can also be used for estimating the rate of change of the channel, and thus adjusting the overall equalizer adaptation rate.

Received samples enter the equalizers $210_1$-$210_N$ and are processed. The equalizers $210_1$-$210_N$ are preferably adaptive equalizers, (well known to those skilled in the art), which require the estimated reference signal being fed back to them. The processed outputs from the equalizers $210_1$-$210_N$ are combined by the equalizer combiner 212. Combining may be a simple arithmetic sum of the two constituent equalizer outputs. Alternatively, maximal ratio combining or preference combining may be implemented.

A combined equalizer output 220, which could be a reference (training) channel, is then fed back to the equalizers $210_1$-$210_N$ for filter coefficient adaptation of the equalizers $210_1$-$210_N$. The combined equalizer output 220 is used to adapt the equalizer coefficients in a manner which jointly optimizes the filters for all of the equalizers $210_1$-$210_N$. Any prior art adaptation algorithm may be used, such as least mean square (LMS), normalized least mean square (NLMS) or any other adaptation algorithm.

In the case of an NLMS algorithm, the combined equalizer output 218 may be despread with a known training signal and compared to a reference signal (not shown), such as a scaled pilot signal, to generate an error signal (not shown). This error signal is used to update the filter coefficients of the equalizers $210_1$-$210_N$. In the case of third generation partnership project (3GPP) wideband code division multiple access (WCDMA) systems, the training signal would be the common pilot channel (CPICH) pilot signal.

The type of training signal is highly dependent on the particular system in which the present invention is implemented. Some systems do not utilize training sequences. In such a case, the error signal may be generated by blind techniques, such as applying hard decisioning to the data.

Figure 3:
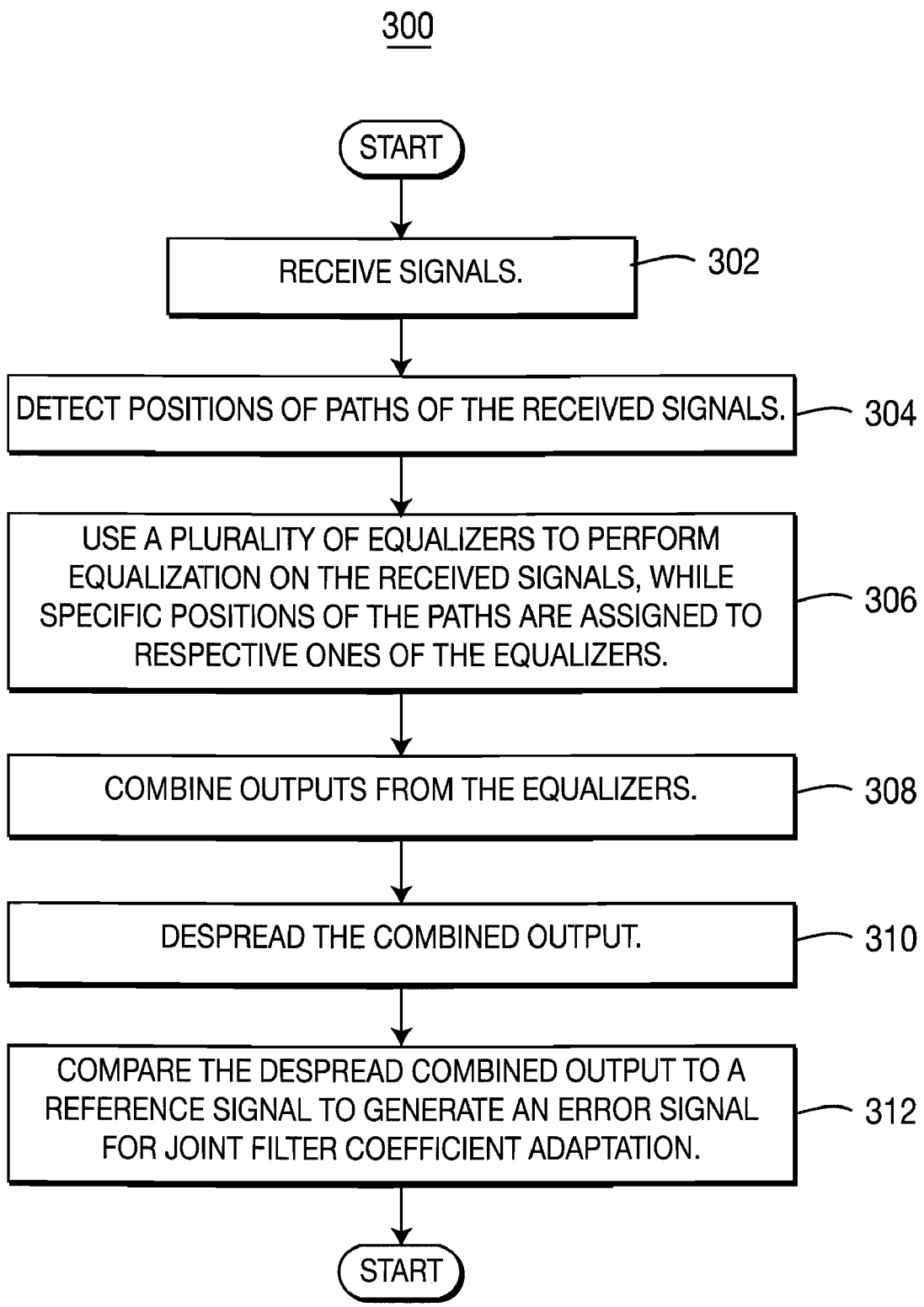
FIG. 3 is a flow diagram of a process for equalizing received signals using the equalization system of FIG. 2.

FIG. 3 is a flow diagram of a process 300 including method steps for equalizing received using the equalization system 200 of FIG. 2. In step 302, signals transmitted from a transmitter are received. In step 304, the positions of paths of the received signals are detected. In step 306, a plurality of equalizers are used to perform equalization on the received signals, while specific positions of the paths are assigned to respective ones of the equalizers. In step 308, the outputs from the equalizers are combined. In 310, the combined output is despread. At 312, the despread combined output is compared to a reference signal to generate an error signal for joint filter coefficient adaptation. The combined equalizer output is fed back for filter coefficient adaptation of the equalizers. Further downstream processing is also performed on the combined equalizer outputs.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of equalizing signals, the method comprising:
receiving signals;
detecting positions of paths of the received signals;
using a plurality of equalizers to performing equalization on the received signals, while specific positions of the paths are assigned to respective ones of the equalizers;
combining outputs from the equalizers;
despreading the combined output with a training sequence; and
comparing the despread combined output to a reference signal to generate an error signal for joint filter coefficient adaptation.

2. The method of claim 1 further comprising: scheduling a search for paths of received signals.

3. The method of claim 1 further comprising:
assigning the specific path positions to the equalizers in accordance with the strength of channel impulse responses associated with the paths.

4. The method of claim 1 wherein the equalizers implement a normalized least mean square (NLMS) algorithm for adapting filter coefficients.

5. The method of claim 1 wherein the combined output of the equalizers is fed back to the equalizers for joint filter coefficient adaptation of the equalizers.

6. The method of claim 5 wherein an error signal for filter coefficient adaptation is generated by processing the combined output of the equalizers using blind detection.

7. A method of equalizing signals, the method comprising:
receiving signals;
detecting positions of paths of the received signals;
using a plurality of equalizers to performing equalization on the received signals, while specific positions of the paths are assigned to respective ones of the equalizers;
combining outputs from the equalizers; and
the equalizers sending equalizer state signals to a multi-equalizer manager, whereby the multi-equalizer manager utilizes the equalizer state signals to allocate and de-allocate the equalizers.

8. The method of claim 7 wherein the equalizer state signals include values of filter coefficients of the equalizers.

9. The method of claim 7 further comprising:
despreading the combined output with a training sequence; and
comparing the despread combined output to a reference signal to generate an error signal for joint filter coefficient adaptation.

10. Apparatus for equalizing received signals, the apparatus comprising:
a path searcher for detecting positions of paths of the received signals;
a plurality of equalizers, each equalizer for performing equalization on a respective one of the paths;
a multi-equalizer manager for controlling the equalizers by assigning specific positions of the paths to each equalizer; and
an equalizer combiner for combining outputs from the equalizers, wherein the combined output is despread with a training sequence and compared to a reference signal to generate an error signal for joint filter coefficient adaptation.

11. The apparatus of claim 10 further comprising a search scheduler for scheduling a search for paths by the path searcher.

12. The apparatus of claim 10 wherein the multi-equalizer manager assigns the specific path positions to the equalizers in accordance with the strength of channel impulse responses associated with the paths.

13. The apparatus of claim 10 wherein the equalizers implement a normalized least mean square (NLMS) algorithm for adapting filter coefficients.

14. The apparatus of claim 10 wherein the combined output of the equalizers is fed back to the equalizers for joint filter coefficient adaptation of the equalizers.

15. The apparatus of claim 10 wherein the apparatus is an integrated circuit (IC).

16. The apparatus of claim 10 wherein the apparatus is a wireless transmit/receive unit (WTRU).

17. Apparatus for equalizing received signals, the apparatus comprising:
a path searcher for detecting positions of paths of the received signals;
a plurality of equalizers, each equalizer for performing equalization on a respective one of the paths;
a multi-equalizer manager for controlling the equalizers by assigning specific positions of the paths to each equalizer; and
an equalizer combiner for combining outputs from the equalizers, wherein the equalizers send equalizer state signals to the multi-equalizer manager, whereby the multi-equalizer manager utilizes the equalizer state signals to allocate and de-allocate the equalizers.

18. The apparatus of claim 17 wherein the equalizer state signals include values of filter coefficients of the equalizers.

19. The apparatus of claim 17 wherein the combined output is despread with a training sequence and compared to a reference signal to generate an error signal for joint filter coefficient adaptation.

20. The apparatus of claim 19 wherein an error signal for filter coefficient adaptation is generated by processing the combined output of the equalizers using blind detection.

21. The apparatus of claim 17 wherein the apparatus is an integrated circuit (IC).

22. The apparatus of claim 17 wherein the apparatus is a wireless transmit/receive unit (WTRU).

* * * * *

UNITED STATES PATENT AND TRADEMARK OFFICE
CERTIFICATE OF CORRECTION

PATENT NO. : 7,593,460 B2 Page 1 of 1
APPLICATION NO. : 11/263507
DATED : September 22, 2009
INVENTOR(S) : Sternberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Twenty-first Day of September, 2010

David J. Kappos
*Director of the United States Patent and Trademark Office*